US011323431B2

(12) United States Patent
Cao et al.

(10) Patent No.: US 11,323,431 B2
(45) Date of Patent: May 3, 2022

(54) SECURE SIGN-ON USING PERSONAL AUTHENTICATION TAG

(71) Applicant: Citrix Systems, Inc., Fort Lauderdale, FL (US)

(72) Inventors: Roger Alexander Cao, Tomball, TX (US); Srinivasa Maddipati, Santa Clara, CA (US); Manoj Andol, San Jose, CA (US); Rucha Deshmukh, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 315 days.

(21) Appl. No.: 16/264,198

(22) Filed: Jan. 31, 2019

(65) Prior Publication Data

US 2020/0252389 A1    Aug. 6, 2020

(51) Int. Cl.
*G06F 21/60* (2013.01)
*H04L 9/08* (2006.01)
*H04L 29/06* (2006.01)

(52) U.S. Cl.
CPC ........ *H04L 63/0815* (2013.01); *G06F 21/602* (2013.01); *H04L 9/0866* (2013.01); *H04L 63/083* (2013.01); *H04L 63/0876* (2013.01)

(58) Field of Classification Search
CPC ............. H04L 63/0815; H04L 63/0428; H04L 63/105; H04L 9/3213; H04L 9/0866; H04L 63/083; H04L 63/0876; G06F 21/41; G06F 21/602

See application file for complete search history.

(56) References Cited

U.S. PATENT DOCUMENTS

| 6,834,795 | B1 * | 12/2004 | Rasmussen ............. G06F 21/33 235/380 |
| 8,453,225 | B2 | 5/2013 | Agarwal et al. |
| 8,479,011 | B2 * | 7/2013 | Ali ......................... G06F 21/78 713/185 |
| 8,973,091 | B2 | 3/2015 | Ting et al. |
| 9,098,687 | B2 * | 8/2015 | Hayton .................. G06F 21/32 |
| 9,143,502 | B2 | 9/2015 | Hinton |
| 10,009,344 | B2 * | 6/2018 | Oberheide .......... H04L 63/0876 |

(Continued)

FOREIGN PATENT DOCUMENTS

WO    0239237    5/2002

OTHER PUBLICATIONS

"Imprivata Virtual Desktop Access", downloaded Feb. 13, 2019 from https://www.imprivata.com/resources/datasheets/imprivata-virtual-desktop-access-citrix-xenapp-and-xendesktop.

(Continued)

*Primary Examiner* — Trang T Doan
(74) *Attorney, Agent, or Firm* — BainwoodHuang

(57) ABSTRACT

A technique for providing access to protected resources uses personal authentication tags (PATs) and enforces a requirement that a workstation sending an authentication request be trusted by a server that receives the request. Accordingly, the server allows an authentication request to proceed only when the request is received from a workstation having a trust relationship with the server. Otherwise, the server denies the authentication request. By restricting PAT-type authentication requests to trusted workstations, risks posed by malicious users are greatly reduced.

23 Claims, 7 Drawing Sheets

(56) References Cited

U.S. PATENT DOCUMENTS

| | | | |
|---|---|---|---|
| 10,021,088 B2* | 7/2018 | Innes | H04L 63/0823 |
| 2005/0204041 A1 | 9/2005 | Blinn et al. | |
| 2006/0075405 A1 | 4/2006 | Sinha | |
| 2006/0294196 A1 | 12/2006 | Feirouz et al. | |
| 2009/0132713 A1 | 5/2009 | Dutta et al. | |
| 2010/0268932 A1 | 10/2010 | Bhattacharjee | |
| 2011/0040749 A1 | 2/2011 | Ceri et al. | |
| 2011/0041171 A1 | 2/2011 | Burch et al. | |
| 2013/0014239 A1 | 1/2013 | Pieczul et al. | |
| 2013/0125226 A1 | 5/2013 | Shah et al. | |
| 2013/0276086 A1* | 10/2013 | Yu | H04L 63/00 726/9 |
| 2014/0123264 A1 | 5/2014 | Shull et al. | |
| 2014/0230027 A1 | 8/2014 | Cha et al. | |
| 2014/0289838 A1 | 9/2014 | Gupta et al. | |
| 2014/0331060 A1* | 11/2014 | Hayton | G06F 21/31 713/186 |
| 2014/0337954 A1 | 11/2014 | Ahmed et al. | |
| 2015/0082025 A1* | 3/2015 | Deshpande | H04L 63/062 713/155 |
| 2017/0116424 A1* | 4/2017 | Aamir | G06F 21/6281 |

OTHER PUBLICATIONS

"Imprivata", downloaded Feb. 13, 2019 from https://citrixready.citrix.com/imprivata.html.

Cesare Pautasso, et al.; "Restful Web Services vs. "Big" Web Services: Making the Right Architectural Decision"; International World Wide Web Conference Committee (IW3C2); WWW 2008; Apr. 21-25, 2008; Beijing, China; 10 pages.

International Search Report and the Written Opinion of the International Searching Authority for International Application No. PCT/US2016/019822, mailed from the European Patent Office dated May 3, 2016, 11 pages.

International Search Report and the Written Opinion of the International Searching Authority, or the Declaration for International Application No. PCT/US2016/019853, mailed from the European Patent Office dated May 13, 2016, 14 pages.

"POST (HTTP)", https://en.wikipedia.org/w/index.php?title=POST_(HTTP)&oldid=639086035, Dec. 21, 2014, Wikipedia, Retrieved on May 3, 2016, 2 pages.

* cited by examiner

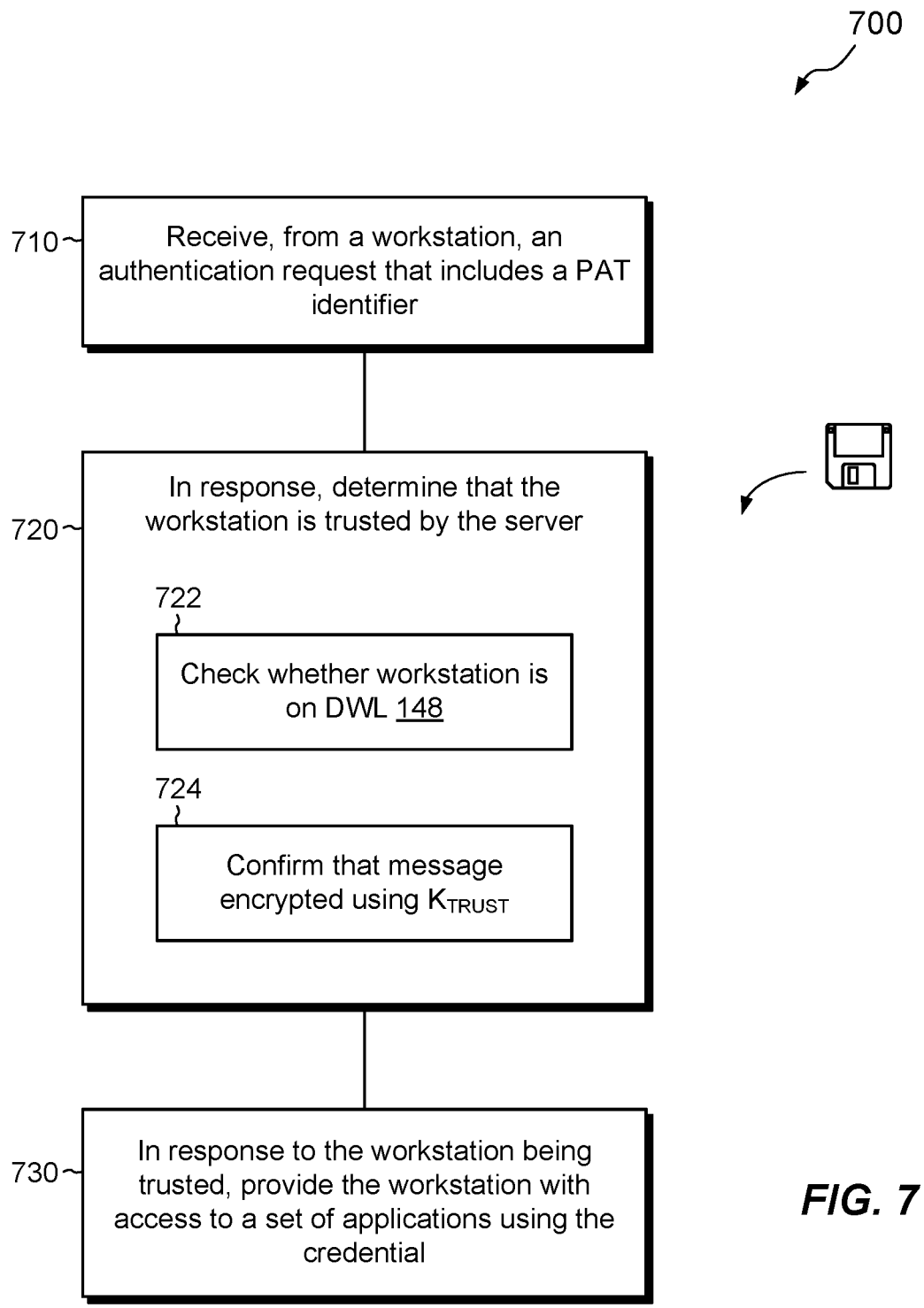

SECURE SIGN-ON USING PERSONAL AUTHENTICATION TAG

BACKGROUND

Many electronic systems restrict user access to computerized resources by requiring users to log on using one or more credentials. For example, a user of a local computer may attempt to access a cloud-based application by supplying credentials in the form of a username and password. The application receives the credentials and tests them against expected values. For example, if the password received from the user matches a previously-stored password for that user, authentication succeeds and the user is granted access to the application. Otherwise, authentication fails and the user's access to the application is blocked.

Some authentication schemes promote user convenience by storing user credentials in association with predetermined codes, where each code corresponds to a respective user's credentials. Each user is given a portable device, such as a badge, and each badge stores a code assigned to the respective user. When a user wishes to log on to a protected resource, such as an application, service, website, or other computerized or electronic resource, the user scans his or her badge and a local machine obtains the code from the badge. The local machine, either alone or with the help of a server, performs a lookup of the user's credentials based on the code. Once the local machine has obtained the credentials for the specified code, the local machine submits the credentials to an authentication server, which applies the credentials to authenticate the user. Assuming authentication succeeds, the user is granted access to the protected resource merely by scanning the badge. No manual entry of a username or password is required.

SUMMARY

Although authentication schemes that use badges and the like can certainly promote user convenience, they can also expose protected resources to unwanted security risks. For example, a malicious user can steal the badge of an authorized user and attempt to access the protected resource from a home, office, or other location. Also, a malicious user who has a valid code and knows the network location and protocol of an authentication server can submit the code from a local machine, gaining unauthorized and potentially dangerous access.

In contrast with these prior schemes, an improved technique for providing access to protected resources uses personal authentication tags (PATs), such as badges and the like, and enforces a requirement that a workstation sending an authentication request be trusted by a server that receives the request. Accordingly, an authentication request is allowed to proceed only when it is received from a workstation having a trust relationship with the server. Otherwise, the authentication request is denied. By restricting PAT-type authentication requests to trusted workstations, risks posed by malicious users are greatly reduced. For example, such users would have to perform their unauthorized acts from trusted workstations, and such workstations may be located in plain view, e.g., in areas that are surveilled by employees and/or security measures, which act as deterrents and increase the risk that a malicious user will be caught.

In some examples, the server stores a credential of the user in encrypted form, and the server encrypts the credential using a symmetric encryption key derived from a code stored by the user's PAT. For example, this arrangement stores the credential in a form that only the user's PAT can decrypt.

In some examples, the technique requires users to supply a PIN (Personal Identification Number) in addition to scanning a PAT. Users must enter their correct PINs in order for authentication to proceed.

In some examples, the server maintains a device white list (DWL) of trusted workstations, and refuses authentication requests arriving from devices that do not appear on the DWL.

In some examples, communications between a trusted workstation and the server are encrypted using an encryption key, such that the server must receive authentication requests encrypted using the encryption key in order for the requests to proceed. According to some variants, a trusted workstation obtains a new encryption key from the server when the trusted workstation boots, or otherwise on some regular basis, so as to limit exposure even if an instance of the encryption key is compromised.

Certain embodiments are directed to a method that includes receiving, by a server over a computer network, an authentication request from a workstation, the authentication request including an identifier of a personal authentication tag (PAT), the PAT being a portable object that provides the PAT identifier in a machine-readable format. In response to receiving the authentication request, the method further includes determining that the workstation is trusted by the server, based on a trust relationship established between the workstation and the server prior to the server receiving the authentication request from the workstation. In response to determining that the workstation is trusted by the server, the method still further includes providing the workstation with access over the computer network to a set of applications of the server using a credential associated with the PAT identifier received with the authentication request.

Other embodiments are directed to a server apparatus constructed and arranged to perform a method, such as the method described above. Still other embodiments are directed to a computer program product. The computer program product stores instructions which, when executed on control circuitry of a server apparatus, cause the server apparatus to perform a method, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIG. 7 is a flowchart showing an example method performed by the server.

DETAILED DESCRIPTION

Embodiments of the improved technique will now be described. One should appreciate that such embodiments are provided by way of example to illustrate certain features and principles but that embodiments are not limited to the particular ones described.

An improved technique for providing access to protected resources uses personal authentication tags (PATs) and enforces a requirement that a workstation sending an authentication request be trusted by a server that receives the request. Accordingly, the server allows an authentication request to proceed only when the request is received from a workstation having a trust relationship with the server. Otherwise, the server denies the authentication request. By restricting PAT-type authentication requests to trusted workstations, risks posed by malicious users are greatly reduced.

Figure 1:
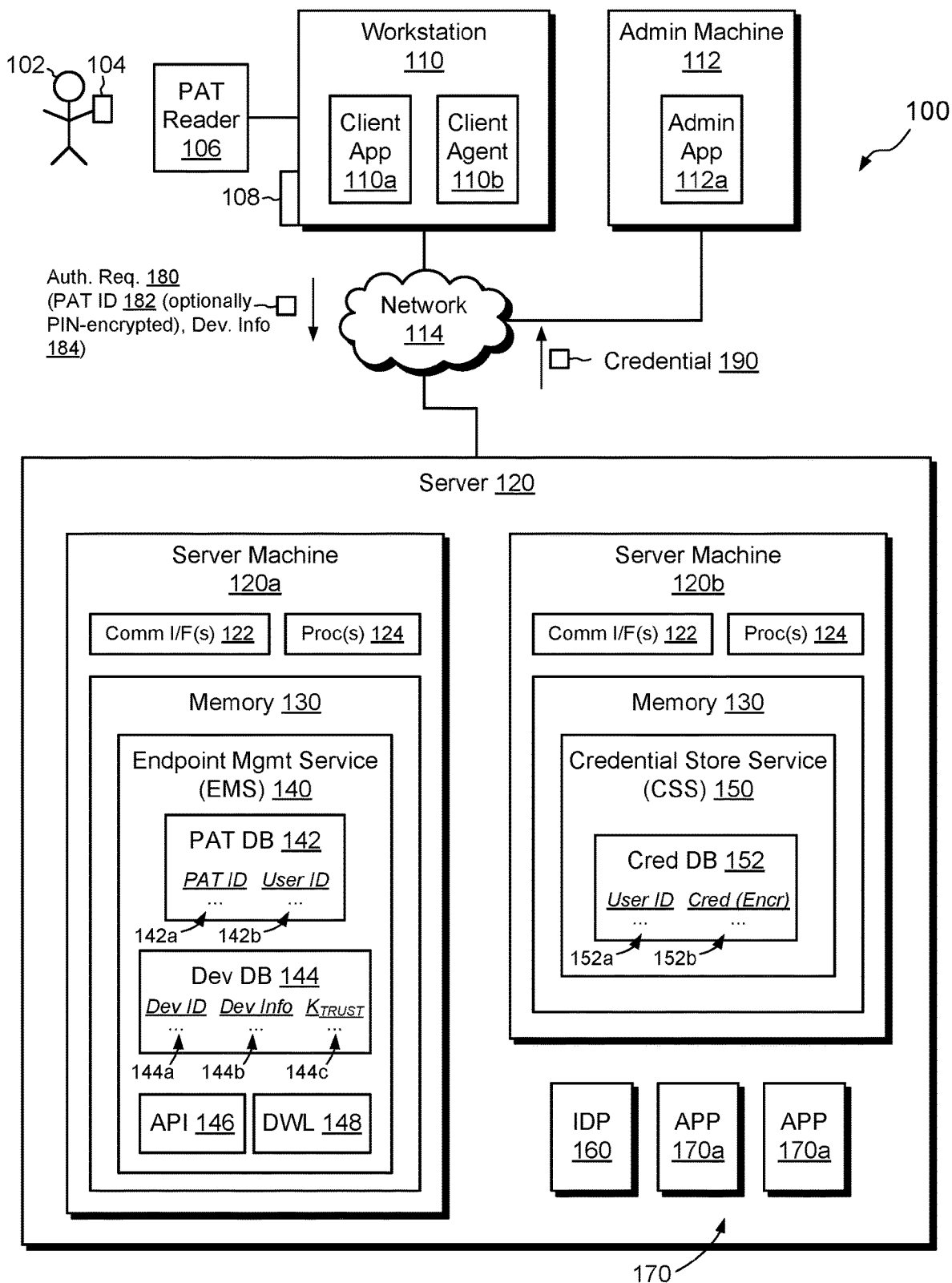
FIG. 1 is a block diagram of an example environment in which embodiments of the improved technique can be practiced.

FIG. 1 shows an example environment 100 in which embodiments of the improved technique can be practiced. Here, a workstation 110 and an administrative machine 112 operatively connect to a server apparatus 120 over a network 114, such as a local area network (LAN), a wide area network (WAN), the Internet, and/or some other network or combination of networks. The workstation 110 includes or otherwise connects to a PAT reader 106, such as a smart card reader, RFID (Radio Frequency Identifier) reader, barcode reader, QR (Quick Response) code reader, or the like. The workstation 110 may be provided as a stationary computer or as a mobile computing device. This is not required, however, as the workstation 110 may be realized as any computerized device capable of connecting to the network 114 and running software. In an example, the workstation 110 runs a client application 110a and a client agent 110b. The client application 110a may be provided in the form of a web browser or a client-side component of a client-server application, the server side of which runs on the server 120. The client agent 110b is a software construct that facilitates logins to the server 120 and may support SSO (single sign-on). The server apparatus 120 (or simply, "server") may include any number of physical server machines (e.g., one or more server machines), with two server machines 120a and 120b specifically shown. In an example, the workstation 110 and administrative machine 112 are located on the premises of an enterprise, such as a company, department, or other organization, and the server 120 is located in the cloud, e.g., on the public Internet. This arrangement is not required, however, as the workstation 110, administrative machine 112, and server 120 may be collocated or distributed in any functional manner. Likewise, the various physical machines of the server 120 may be collocated or distributed.

As further shown in FIG. 1, the server 120 is configured to run an IDP (Identity Provider) 160 and any number of applications, such as applications 170a and 170b. Non-limiting examples of the IDP 160 include OpenLDAP (open source Lightweight Directory Access Protocol) and Microsoft ADFS (Active Directory Federated Services). Non-limiting examples of applications 170 include file sharing applications, virtualized application services, and virtual desktop applications. The IDP 160 and applications 170 may run on the server machines 120a and/or 120b and/or on other server machines (not shown).

Each of the server machines 120a and 120b includes one or more communication interfaces 122, a set of processors 124, and memory 130. The communication interfaces 122 provide, for example, network interface adapters for converting electronic and/or optical signals received over the network 114 to electronic form for use by the respective server machines. Each set of processors 124 includes one or more processing chips and/or assemblies, such as numerous multi-core CPUs (central processing units). Each memory 130 includes both volatile memory, e.g., Random Access Memory (RAM), and non-volatile memory, such as one or more Read-Only Memories (ROMs), disk drives, solid state drives, and the like. The sets of processors 124 and the memories 130 of the server machines 120a and 120b form control circuitry, which is constructed and arranged to carry out various methods and functions as described herein. Also, each memory 130 includes a variety of software constructs realized in the form of executable instructions. When the executable instructions are run by the respective set of processors 124, the set of processors 124 carry out the respective operations of the software constructs. Although certain software constructs are specifically shown and described, it is understood that each memory 130 typically includes many other software components, which are not shown, such as an operating system, various applications, processes, and daemons. Although not specifically shown, one should appreciate that the workstation 110 and the administrative machine 112 also include respective network interfaces, processors, and memory, which form respective control circuitry for carrying out various operations.

As further shown in FIG. 1, the memory 130 of server machine 120a "includes," i.e., realizes by execution of software instructions, an endpoint management service (EMS) 140. The EMS 140 itself includes a PAT (personal authentication tag) database 142, a device database 144, an API (application program interface) 146, and a DWL (device white list) 148.

In an example, the PAT database 142 stores multiple records that associate PAT identifiers 142a with respective user identifiers 142b. For example, a unique PAT identifier 142a is assigned to each registered user. The PAT database 142 enables the server 120 to identify users based on presented PAT identifiers 142a using lookups.

Each PAT 104 stores a PAT identifier 142a and provides the PAT identifier to a PAT reader 106 at suitable times. For example, a PAT 104 may be a smart card, an RFID tag, a barcode tag, a QR code tag, or an electronic device that stores a PAT identifier 142a, such as a smart phone, a PDA (personal data assistant), a tablet computer, a laptop, or the like. The PAT 104 may be electronically readable, optically readable, wirelessly readable (e.g., using Bluetooth or Wi-Fi), or readable in any other manner.

The device database 144 associates unique device identifiers 144a of registered devices with respective device information 144*b* and encryption keys 144*c*. Device identifiers 144*a* may be stored, for example, as MAC (Media Access Controller) addresses, serial numbers, network addresses, or the like, and device information 144*b* may include makes and models of devices, operating systems, system versions, geographical locations, and so forth. Encryption keys 144*c* ($K_{TRUST}$) are preferably unique to each registered device and support encrypted communications between the server 120 and trusted devices.

API 146 supports encrypted communications with trusted devices, using encryption keys 144*c*, and DWL 148 provides a device white list, i.e., a list of trusted devices. As will be described more fully below, the server 120 may determine whether a device is trusted based on whether the device is listed on the DWL 148 and/or based on whether messages received from the device are encrypted using the appropriate key 144*c*.

Turning now to server machine 120*b*, the memory 130 includes a credential store service (CSS) 150, which stores a credential database 152. The credential database 152 stores multiple records, and each record associates a user identifier 152*a* with a corresponding credential 152*b*, such as a password, passcode, or other code. Preferably, the credential database 152 stores the credential 152*b* in encrypted form, with the credential encrypted using a key $K_{PAT}$ that is derived from the PAT identifier 142*a* of the PAT 104 assigned to the corresponding user. Derivation of $K_{PAT}$ from the PAT identifier 142*a* may involve performing a mathematical operation, a combinatorial operation, an algorithm, or some other operation or combination of operations, which preferably makes $K_{PAT}$ difficult to guess based on the PAT identifier alone. This is not required, however, as $K_{PAT}$ may simply be the PAT identifier itself or a slightly modified version thereof. The key $K_{PAT}$ used to encrypt the credential 152*b* may be a symmetric key, such that the same key may also be used to decrypt the credential 152*b*. To decrypt a particular credential 152*b*, for example, the server 120 identifies the user identifier 152*a* associated with the credential 152*b* and performs a lookup into the PAT database 142 using the user identifier 152*a*. The server 120 then accesses the PAT identifier 142*a* that corresponds to that user identifier, derives the key $K_{PAT}$ from the PAT identifier 142*a*, and applies the derived key $K_{PAT}$ to the encrypted password 152*b*. To promote security, the EMS 140 and the CSS 150 preferably run on different server machines, in the manner shown, such that a fraudster or some other unauthorized person in possession of a PAT identifier 142*a* would need to access two separate machines in order to obtain the corresponding credential 152*b*. Thus, the distributive nature of the system provides improved security over conventional or otherwise known computing architectures.

In example operation, an administrator runs and administrative application 112*a* on administrative machine 112 to register a PAT 104 to a particular user, such as user 102. For instance, the administrator creates a new record in the PAT database 142, which associates a particular PAT identifier 182 stored by the PAT 104 with the particular user 102 to whom the PAT 104 is assigned. The administrator may also register various devices, such as workstation 110, to establish a trust relationship between the devices and the server 120. Device registration may involve adding an identifier of the device to the DWL 148 and/or directing the device to contact the server 120 to obtain an encryption key 144*c* to be used in communicating with the server 120. Other ways of establishing trust may involve the use of certificates, third-party services, other encryption schemes, or the like. Although the term "trust relationship" may have a specialized meaning in certain operating systems or computing environments, the term is used herein in a general sense and is not constrained to any specialized meaning.

Once the user 102 has possession of the PAT 104, the user 102 may attempt to log on to one or more applications 170 of the server 120 using the PAT 104. For example, the user 102 may approach the workstation 110 and wave the PAT 104 over the PAT reader 106, or perform some other action that causes the PAT reader 106 to read the PAT identifier 182 from the PAT 104. The PAT reader 106 then provides the PAT identifier 182 to the workstation 110. The client application 110*a* responds to receipt of the PAT identifier 182 by contacting the server 120 and sending the server 120 an authentication request 180, which includes the PAT identifier 182 as well as device information 184 describing the workstation 110. The server 120 receives the authentication request 180 and determines whether the request originates from a trusted workstation. For example, the server 120 performs an operation configured to produce a first result if the server 120 confirms that the originating device is trusted and to produce a second result otherwise. If the operation produces the second result, the authentication request 180 fails. In this case, the process ends and the login attempt is blocked. However, if the operation produces the first result, indicating that the workstation 110 is trusted, then authentication can proceed. In an example, the operation succeeds (produces the first result) if the workstation 110 is listed on the DWL 148 and/or if the authentication request 180 or other message from the workstation 110 is encrypted using the key 144*c* that the device database 144 associates with the workstation 110.

Assuming that authentication proceeds, the server 120 performs a lookup into the PAT database 142 to determine whether the received PAT identifier 182 is within the PAT database 142. Assuming the PAT identifier 182 is found in the PAT database 142, the server 120 identifies the user identifier 142*b* associated with the PAT identifier 182. With the user identifier 142*b*, the server 120 performs a lookup into the credential database 152 and identifies a particular credential 190 associated with that user identifier. If this is the first time the user 102 has attempted to use the PAT 104, the credential database 152 may store no entry for the user 102 and the lookup into the credential database 152 may fail. In this case, the server 120 may direct the user 102 to supply the user's credential 190, e.g., by directing the workstation 110 to prompt the user 102 to enter the credential (see step 422 in FIG. 4). In some examples, the server 120, having received the credential 190 from the user 102, contacts the IDP 160 to confirm that the user's credential 190 is correct (see verification operation 438*a* in FIG. 4). If the user 102 enters an incorrect credential, the server 120 may prompt the user to again enter the credential or may fail the login if the user is unable to do so.

Assuming the user 102 enters the correct credential, the server 120 creates a new record in the credential database 152, which stores the received credential 190 (preferably encrypted) in connection with the identifier of the user 102. The server 120 may then return the user identifier 142*b* and associated credential 190 to the workstation 110, so that the workstation 110 can supply them in a login request to one or more of the applications 170. Alternatively, the server 120 may directly apply the user identifier 142*b* and the credential 190 as part of a login request to one or more of the applications 170. As yet another example, the server 120 may exchange the credential 190 for a SAML (Security Assertion Markup Language) token and provide the SAML token to the workstation 110, enabling the workstation 110 to logon to one or more of the applications 170 using the token.

In the manner described, the server 120 denies PAT-based authentication requests arriving from untrusted workstations and allows authentication to proceed from trusted workstations only. This arrangement limits PAT-based access to those requests arriving from trusted workstations, which are likely to be limited in number and may be subject to additional security measures, such as surveillance.

Authentication requests received from trusted workstations do not automatically succeed, but may succeed or fail based on whether PAT identifiers correspond to valid credentials.

In some examples, security may be enhanced even further by requiring the user to enter additional entropy when making authentication requests, such as a user PIN (Personal Identification Number) or other user-specific information that is difficult for third parties to guess. According to this arrangement, the administrative application 112a assigns a PIN to the user 102 when first registering the user's PAT 104 with the server 120. The PIN may be user-selected or automatically-generated, for example. The administrative application 112a encrypts the PAT identifier 182 using the PIN to produce a PIN-encrypted PAT identifier, which the server 120 stores in the PAT database 142. The PAT database 142 does not necessarily have knowledge that the PAT identifier 182 is PIN-encrypted and does not require such knowledge. The server 120 encrypts the user's credential 190 using a key derived from the PIN-encrypted PAT identifier, and stores the encrypted credential in the credential database 152.

When the user 102 later attempts to logon using the PAT 104, e.g., by waving the PAT 104 over the PAT reader 106, the workstation 110 prompts the user to enter the PIN, e.g., on a keyboard or keypad 108 connected to or integral with the workstation 110. The workstation 110 receives the PIN from the user 102 and applies the PIN as an encryption key for encrypting the PAT identifier 182, which the workstation 110 receives from the PAT reader 106. The workstation 110 then sends an authentication request 180, which provides the PIN-encrypted PAT identifier, to the server 120, so that the server 120 receives the PAT identifier 182 in PIN-encrypted form, i.e., in the same form with which the administrator registered the PAT identifier 182. The use of a PIN greatly enhances security as it means that a fraudster in possession of a PAT 104 would have to know the user's PIN in order to authenticate successfully.

Figure 2:
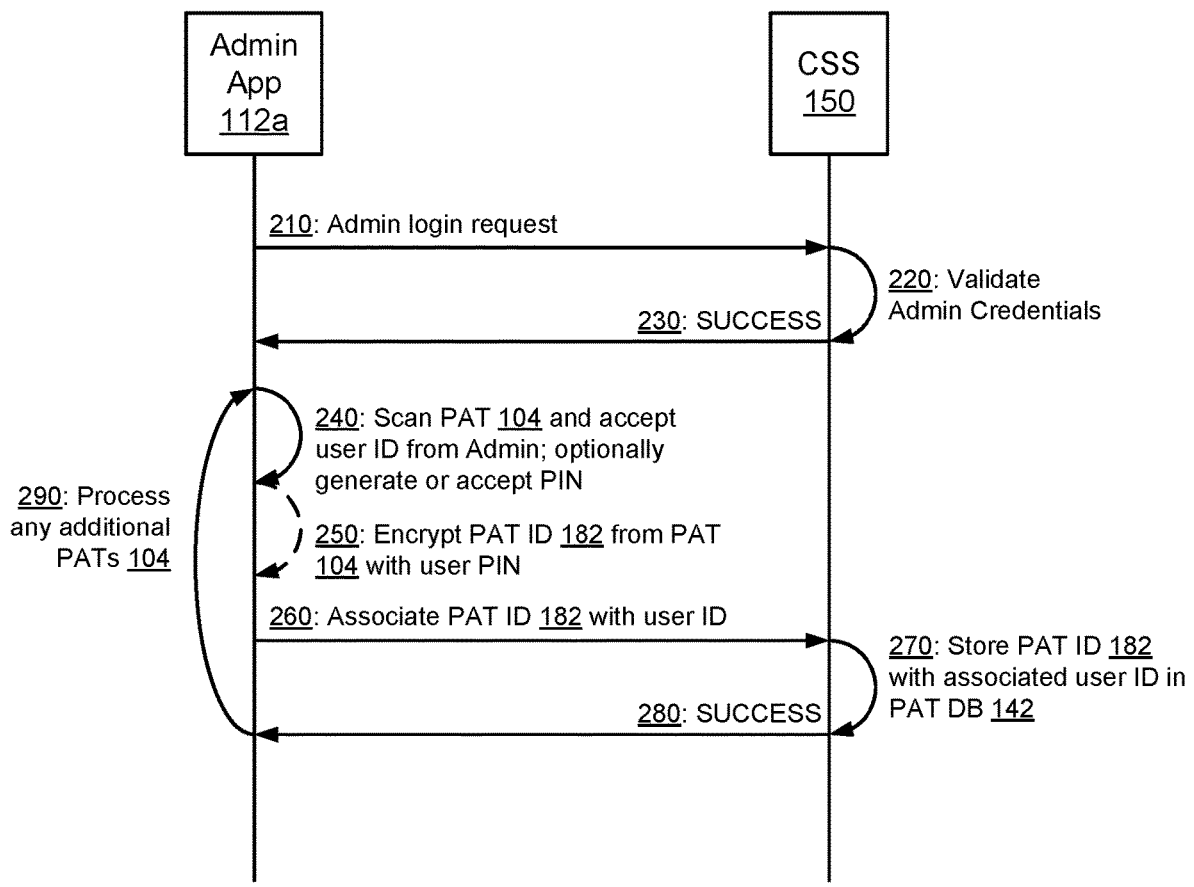
FIG. 2 is a sequence diagram showing an example arrangement for registering different PATs (Personal Authentication Tags) for respective users.

FIG. 2 shows an example sequence for associating PATs 104 with respective users 102 on the server 120. The illustrated sequence is carried out between the administrative application 112a and the credential store service (CSS) 150 of the server 120 and is preferably performed prior to dispensing a PAT 104 to the user 102.

At 210, the administrator directs the administrative application 112a to send a login request to the CSS 150. For example, the administrator must properly log on before being permitted to register new PATs 104. At 220, the CSS 150 checks the administrator's credentials, such as by confirming the administrator's username, password, token code, biometrics, and/or any other authentication factors required. At 230, assuming the administrator's credentials are confirmed, the CSS 150 sends a successful result back to the administrative application 112a.

At 240, the administrative application 112a prompts the administrator to enter a PAT identifier, e.g., by scanning a PAT 104 using a device similar to the PAT reader 106, and to enter a corresponding user identifier 142b for the user 102 to whom the PAT 104 is being assigned. If a PIN is to be used, the administrative application 112a may also prompt the administrator to generate or otherwise provide a PIN for the user, preferably in a manner that does not reveal the PIN to the administrator. At 250, assuming a PIN is used, the administrative application 112a encrypts the PAT identifier 182 from the PAT 104 using the user's PIN.

At 260, the administrative application 112a sends a request to the CSS 150 to associate the PAT identifier 182 (encrypted or not) with the user ID of the user 102. At 270, the CSS 150 stores the PAT identifier 182 and the associated user identifier in a new record of the PAT database 142, such as by creating a new record in the PAT database 142, placing the PAT identifier 182 in the field 142a of the new record, and placing the user ID in the field 142b. At 280, the CSS 150 notifies the administrative application 112a of the successful entry. At 290, the sequence of steps 240-280 may be repeated for any additional PATs 104, e.g., if the administrator wishes to set up records for multiple PATs and users during the same session.

One should appreciate that the server 120 is preferably agnostic to whether the PAT identifier 182 is encrypted using a PIN or not. From the standpoint of the server 120, an encrypted PAT identifier is no different from an unencrypted one.

Figure 3:
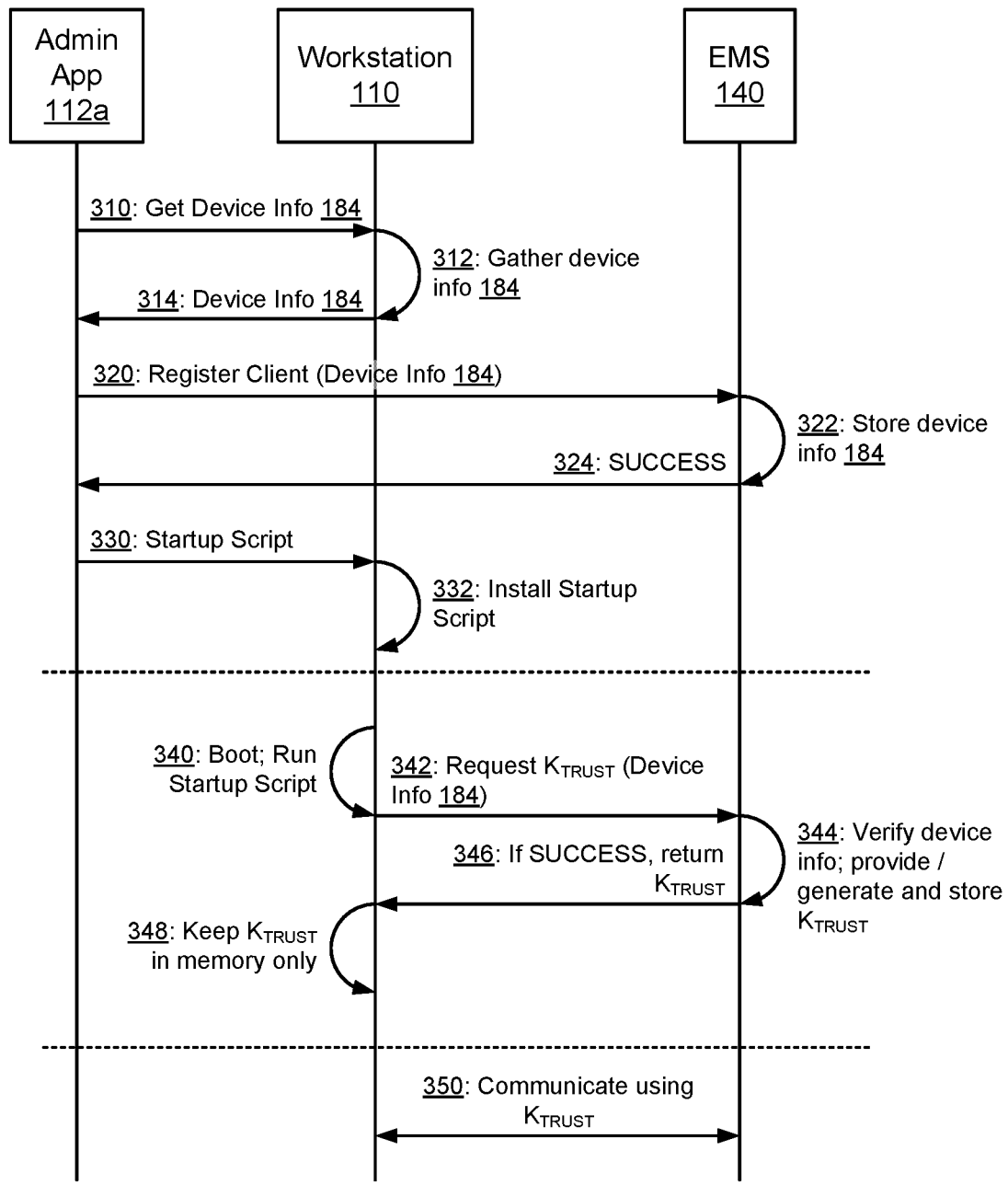
FIG. 3 is a sequence diagram showing an example arrangement for registering a workstation with a server for establishing a trust relationship between the workstation and the server.

FIG. 3 shows an example sequence for establishing and implementing a trust relationship between a device, such as the workstation 110, and the server 120. The illustrated sequence is carried out among the administrative application 112a, the workstation 110, and the endpoint management service (EMS) 140 of the server 120. A trust relationship such as the one shown in FIG. 3 may be established as a precondition for granting access to applications 170 using PAT-based authentication requests originating from the workstation 110.

At 310, the administrative application 112a sends a request to the workstation 110 to get device information 184, such as the workstation's make and model, operating system, version, geographical location, and so forth. The device information 184 may also include a unique device identifier. At 312, the workstation 110 gathers the device information 184, e.g., by running a data collection routine that accesses system information, and, at 314, the workstation 110 returns the device information 184 to the administrative application 112a.

At 320, having obtained the device information 184 from the workstation 110, the administrative application 112a sends the device information 184 in a registration request to the EMS 140. At 322, the EMS 140 stores the device information 184 in the device database 144. The EMS 140 may also add the device identifier to the DWL 148. At 324, the EMS 140 reports back that the device has been registered with the system 140 ("SUCCESS").

With the device information 184 successfully stored by the EMS 140 and the workstation 110 successfully registered, the administrative application 112a at 330 may configure the workstation 110 to obtain one or more encryption keys from the server 120. For example, the application 112a may send a startup script to the workstation 110. The startup script is configured to execute when the workstation 110 boots and preferably each time the workstation boots. At 332, the workstation 110 installs the startup script, such as by placing the script in a startup folder.

Sometime later, at 340, upon a boot-up of the workstation 110, the workstation 110 runs the startup script. The startup script sends a request at 342 to the EMS 140 for a new encryption key, $K_{TRUST}$. The request at 342 includes the device information 184. At 344, the EMS 140 checks the device information 184 and, assuming the information can be verified, generates a new value of $K_{TRUST}$, which is preferably unique to the workstation 110, and stores the new value in the device database 144. In an example, the EMS 140 checks the device information 184 by comparing the device information as received in the request at 342 with device information previously stored by the EMS 140 (e.g., at step 322). The EMS 140 verifies the device information by confirming that the two instances of device information match. At 346, the EMS 140 returns the newly generated instance of $K_{TRUST}$ to the workstation 110. At 348, the workstation stores $K_{TRUST}$, but preferably does so in volatile memory only, such that $K_{TRUST}$ is difficult for hackers to locate and extinguishes upon a reboot of the workstation 110.

Later still, when a user of the workstation 110 attempts to perform a PAT-based authentication, e.g., by waving a PAT over the PAT reader 106, the workstation 110 sends an authentication request 180 to the server 120 in encrypted form, with the request encrypted using the current instance of $K_{TRUST}$ stored in its volatile memory. As the server 120 also stores this version of $K_{TRUST}$, messages between the workstation and the server 120 (at 350) can be sent using the same key in both directions. In some examples, $K_{TRUST}$ is provided as a single, symmetric key, which can be used both for encrypting and decrypting messages. In other examples, $K_{TRUST}$ is provided as multiple keys. For example, the workstation 110 and the server 120 may each employ a public/private key pair, with each sharing its public key with the other and with keys being regenerated upon each boot of the workstation 110.

Figure 4:
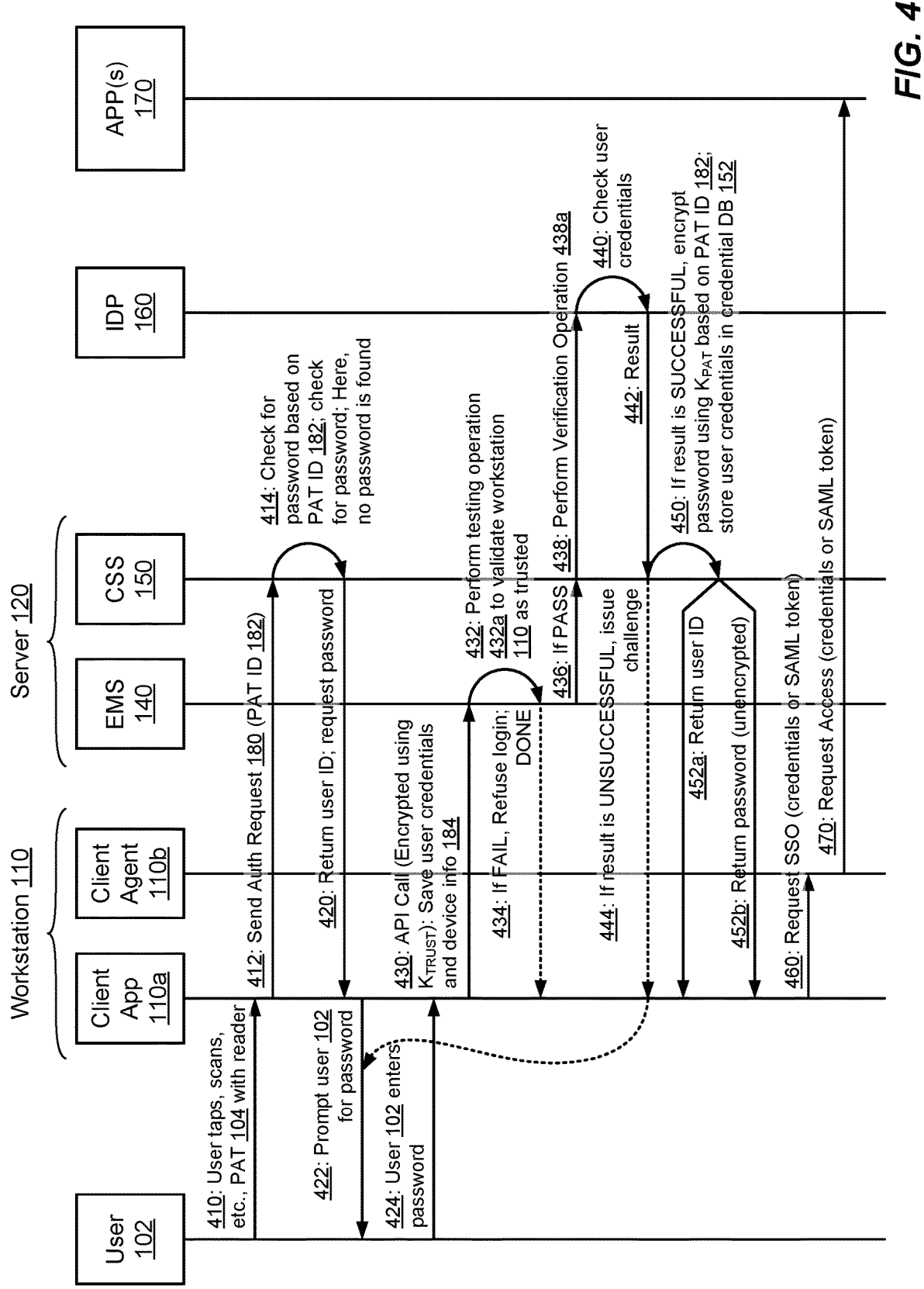
FIG. 4 is a sequence diagram showing one example arrangement for using a PAT to access one or more applications of the server.

FIG. 4 shows an example sequence for performing a first-time PAT-based authentication after a PAT 104 has been assigned to a user 102. The depicted sequence takes place among the user 102, the client application 110a and client agent 110b of the workstation 110, the EMS 140 and CSS 150 of the server 120, the IDP 160, and one or more of the applications 170. Although the sequence of FIG. 4 is shown at a fine level of granularity, one should appreciate that the depicted sequence is merely an example and should not be construed as limiting.

At 410, the user 102 scans a PAT 104 using the PAT reader 106. The client application 110a receives the PAT identifier 182. Optionally, the client application 110a prompts the user to enter the user's PIN and encrypts the PAT identifier 182 using the PIN as an encryption key.

At 412, the client application 110a sends an authentication request 180 to the CSS 150, providing the PAT identifier 182, which may be PIN-encrypted. At 414, the CSS 150 determines that no credential (e.g., password) has been stored for the user 102. For example, the CSS 150 may contact the EMS 140 to obtain a user identifier of the user 102 from the PAT database 142 based on the PAT identifier 182. Assuming a user identifier is found, the CSS 150 may search for but fail to locate a credential for that user in the credential database 152 (e.g., because none has yet been stored). At 420, the CSS 150 replies to the authentication request 180, by providing the user's user identifier and directing the client application 110a to request the user's credential. At 422 the client application 110a prompts the user 102 for the credential, and at 424 the user 102 enters the credential. At 430, the client application 110a makes an API call to the EMS 140, supplying the user identifier, the credential, and device information 184 of the workstation 110, and directing the EMS 140 to save this information. The API call is preferably encrypted, using the current version of $K_{TRUST}$ shared between the workstation 110 and the server 120.

At 432, the EMS 140 performs an operation to determine whether the workstation 110 is trusted. For example, the EMS 140 checks whether the device identifier of the workstation 110 is listed on the DWL 148. In addition, or alternatively, the EMS 140 checks whether a message received from the workstation 110 is encrypted using $K_{TRUST}$. For example, encryption using $K_{TRUST}$ may be required for workstations calling in from outside an enterprise office or campus, whereas being listed on the DWL 148 may be sufficient for on-premises use. If either of these conditions is met, for example, the operation is a success and the workstation 110 is confirmed to be trusted. If the operation 432a fails (produces the second result), the EMS 140 refuses the authentication request 180 at 434 and the process completes. The authentication request 180 is denied because the workstation 110 is not confirmed to be trusted.

If the operation 432a succeeds, however (produces the first result), then authentication proceeds and the EMS 140 notifies the CSS 150 of the successful result at 436. At 438, the CSS 150 directs the IDP 160 to perform a verification operation 438a of the user's credential. At 440, the IDP 160 checks the user's credential and provides a result at 442. For example, the user's credential may be the user's network password which the IDP 160 already stores in connection with that user. By checking the password with the IDP 160, the server 120 can confirm that the user has entered the correct password. If the result is unsuccessful (at 444), meaning that the IDP 160 did not confirm the user's credential, then operation may return to 422, whereupon the client application 110a again prompts the user 102 for the password, under the assumption that the user has typed the wrong password. Authentication may fail if this happens repeatedly.

If the result of the verification operation 438a is successful, then at 450 the CSS 150 encrypts the credential using the key $K_{PAT}$, which is derived from the PAT identifier 182, which may itself be encrypted by a PIN. The CSS 150 stores the user identifier and encrypted credential in a new entry of the credential database 152. The CSS 150 then returns the user identifier and credential of the user 102 to the client application 110a. Preferably, the user identifier and the credential are sent in separate transmissions 452a and 452b. Using separate transmissions makes it more difficult for eavesdroppers to associate the user identifier with the credential, as they are separated in time on a busy network, and thus provides an added measure of security. Alternatively, the CSS 150 may exchange the user identifier and credential of the user for a SAML token and provide the SAML token to the client application 110a. The use of SAML may be preferred in diverse environments, as it provides interoperable standard interfaces that allow application software and security systems to be developed and modified independently.

At 460, the client application 110a provides the credentials or SAML token to the client agent 110b, and at 470 the client agent 110b sends and access request to one or more of the applications 170, providing the credentials or SAML token. The user 102 is then granted authenticated access to the applications 170 and can operate the applications remotely from the workstation 110.

Figure 5:
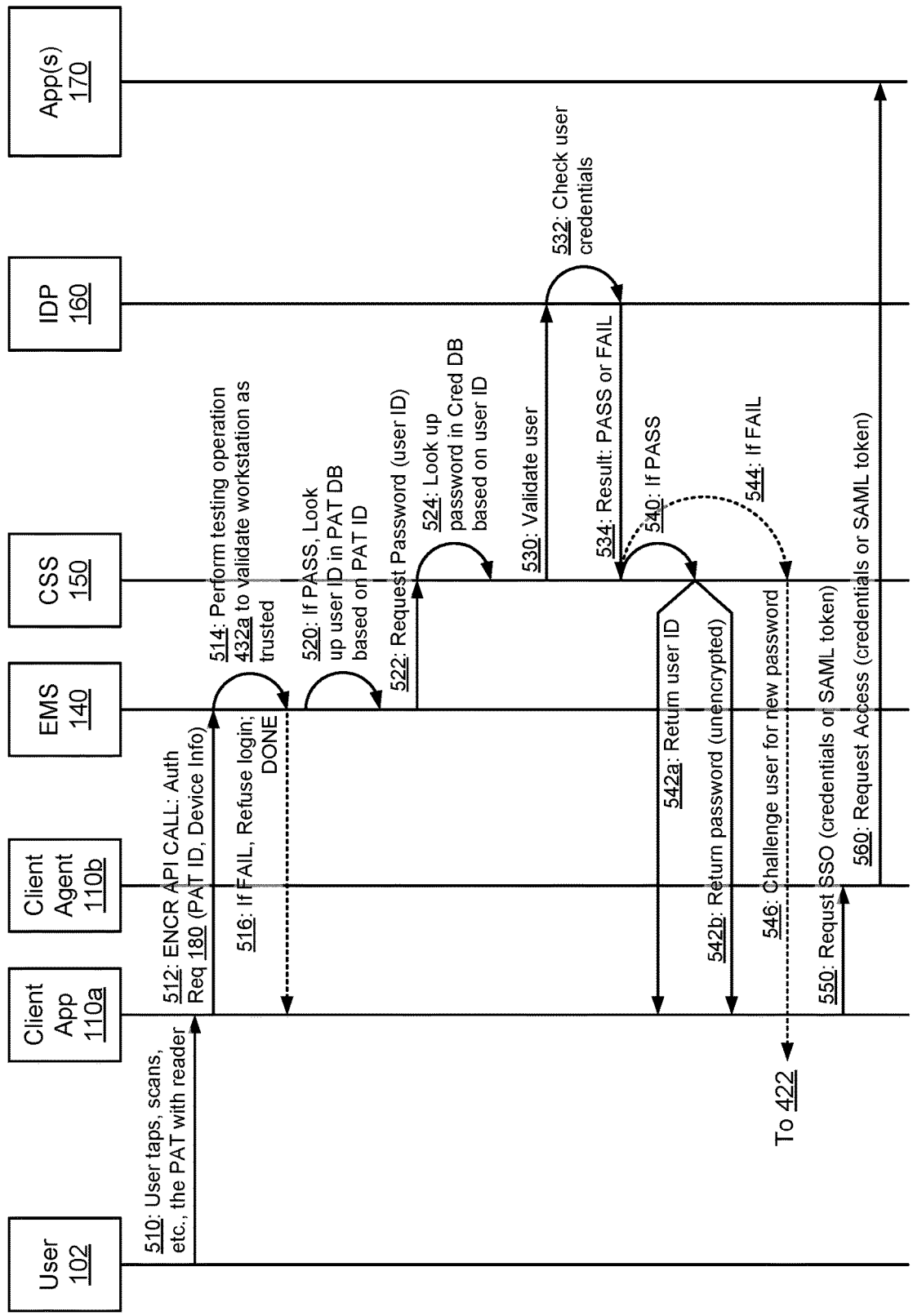
FIG. 5 is a sequence diagram showing another example arrangement for using a PAT to access one or more applications of the server.

FIG. 5 shows an example sequence for performing a PAT-based authentication after the first-time sequence of FIG. 4 has been run. The FIG. 5 sequence similarly takes place among the user 102, the client application 110a and client agent 110b of the workstation 110, the EMS 140 and CSS 150 of the server 120, the IDP 160, and one or more of the applications 170. One should appreciate that the depicted sequence of FIG. 5 is merely an example and should not be construed as limiting.

The sequence starts as before, with the user 102 attempting at 510 to log on by scanning the PAT using the PAT reader 106. The client application 110a receives the PAT identifier 182 from the scanned PAT. Optionally, the client application 110a prompts the user to enter a PIN and proceeds to encrypt the received PAT identifier 182 using the PIN as an encryption key.

At 512, the client application 110a submits an authentication request 180 to the EMS 140, via an encrypted API call (encrypted using $K_{TRUST}$). The authentication request 180 specifies the PAT identifier 182 of the scanned PAT (encrypted if a PIN is used) and device information 184, which may include a device identifier 144a of the workstation 110.

At 514, the EMS 140 performs an operation 432a to determine whether the workstation 110 is trusted. For example, the EMS 140 checks whether the device identifier of the workstation 110 is listed on the DWL 148 and/or whether a message received from the workstation 110 is encrypted using $K_{TRUST}$. If the operation fails, at 516, the EMS 140 refuses the authentication request 180 and the process completes. If the operation succeeds, however, the operation proceeds to 520, whereupon the EMS 140 performs a lookup into the PAT database 142 to obtain the user identifier associated with the received PAT identifier 182. At 522 the EMS 140 contacts the CSS 150 and requests the user's credential, and at 524 the CSS 150 performs a lookup into the credential database 152 to get the user's credential based on the user identifier obtained from the PAT database 142.

As before, the CSS 150 contacts the IDP 160 (at 530) to confirm that the credential is valid. The credential may be invalid, for example, if the user 102 has changed the credential (e.g., network password) or if the user has left the organization. At 532, the IDP 160 checks the user's credential and produces a result at 534 (PASS or FAIL). If the result is PASS at 540, meaning that the IDP 160 has verified the credential, the CSS 150 returns the user identifier and the credential to the workstation 110, e.g., in separate transmissions 542a and 542b. Alternatively, the CSS 150 may exchange the user identifier and credential of the user for a SAML token and provide the SAML token to the client application 110a. At 550, the client application 110a provides the credentials or SAML token to the client agent 110b, and at 560 the client agent 110b sends and access request to one or more of the applications 170, providing the credentials or SAML token. The user 102 is then granted authenticated access to the applications 170 as before and can operate the applications remotely from the workstation 110.

Returning to 534, if the IDP 160 does not confirm the user's credential, then the result is FAIL (544), and the CSS 150 challenges the user 102 for a new credential (at 546). Operation may then proceed to act 422 in FIG. 4, where the user 102 is prompted for the credential.

Figure 6:
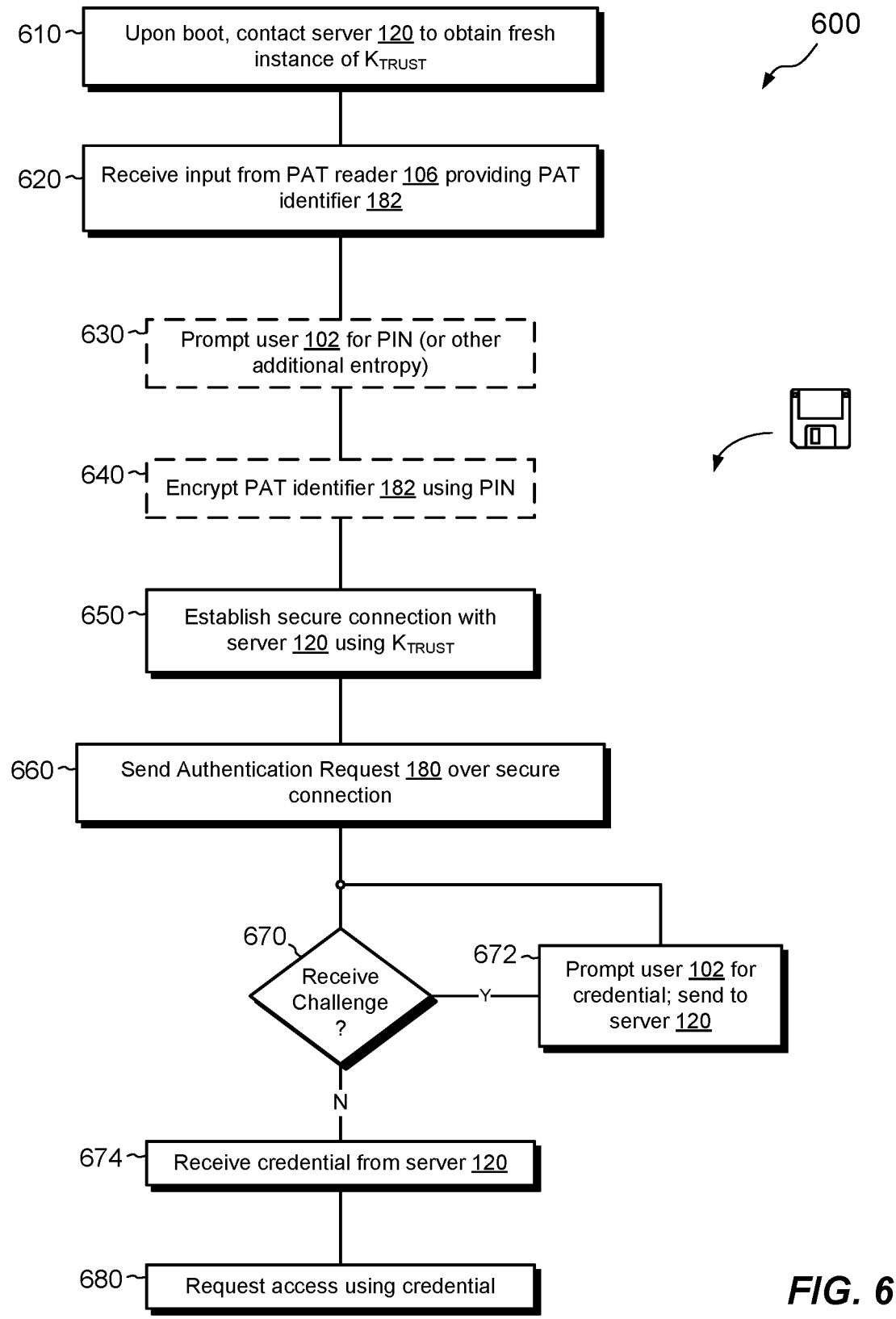
FIG. 6 is a flowchart showing example activities performed by a trusted workstation.

FIG. 6 shows an example method 600 that may be carried out by the workstation 110, e.g., as a result of the workstation 110 executing software instructions in its memory using its processor. The various acts of method 600 may be ordered in any suitable way. For example, embodiments may be constructed in which acts are performed in orders different from that illustrated, which may include performing some acts simultaneously.

At 610, upon a boot-up of the workstation 110, the workstation 110 contacts the server 120 to obtain a fresh instance of $K_{TRUST}$, i.e., a newly generated version of the encryption key used to conduct secure communications with the server 120, and which may be used as a basis for proving that the workstation 110 is trusted. In an example, the workstation 110 obtains $K_{TRUST}$ as a result of running the startup script described in connection with FIG. 2.

Sometime later, at 620, the workstation 110 receives the PAT identifier 182 of the PAT 104 (see also acts 410 and 510 of FIGS. 4 and 5, respectively). For example, the user 102 may scan the PAT 104 using the PAT reader 106 to provide the PAT identifier 182 to the workstation 110.

At 630, assuming a PIN is to be used, the workstation 110 prompts the user 102 to enter the PIN. At 640, the workstation 110 encrypts the PAT identifier 182 using the PIN as an encryption key.

At 650, the workstation 110 establishes a secure connection with the server 120, exchanging messages that are encrypted using $K_{TRUST}$. At 660, the workstation 110 sends an authentication request 180 to the server 120 over the secure connection, providing the PAT identifier 182 (PIN-encrypted if a PIN is used) and device information 184, which may include the device identifier of the workstation 110 (see also acts 412 and 512).

At 670, the workstation 110 may receive an authentication challenge, e.g., if the server 120 does not store a credential for the user or if the credential has changed, e.g., as a result of user having established a new credential with the IDP 160. If a challenge is received, then at 672 the workstation 110 prompts the user 102 for the credential and sends the entered credential to the server 120. However, if no challenge is received, operation proceeds to 674, whereupon the workstation 110 receives the credential from the server 120 (see also 452a and 452b of FIGS. 4 and 542a and 542b of FIG. 5). At 680, the workstation 110 uses the credential to request access to one or more applications 170.

FIG. 7 shows an example method 700 that may be carried out by the server 120, e.g., as a result of the server machines 120a and 120b executing software instructions in their memories 130 using their respective sets of processors 124. The various acts of method 700 may be ordered in any suitable way.

At 710, an authentication request 180 is received over a computer network 114 from a workstation 110. The authentication request 180 includes an identifier 182 of a personal authentication tag (PAT) 104. The PAT 104 is a portable object that provides the PAT identifier 182 in a machine-readable format, such as using a smart card, RFID, barcode, QR code, or the like.

At 720, in response to receipt of the authentication request 180, the server 120 determines that the workstation 110 is trusted, based on a trust relationship established between the workstation 110 and the server 120 prior to receipt of the authentication request 180 from the workstation 110. The trust relationship is established, for example, using the sequence described in connection with FIG. 3. Determining whether the trust relationship is established may include (at 722) checking whether the workstation 110 is listed on the DWL 148 and/or (at 724) confirming that a message received from the workstation 110 has been encrypted using a key $K_{TRUST}$ previously obtained from the server 120.

At 730, in response to a determination that the workstation 110 is trusted by the server 120, the server 120 may provide the workstation 110 with the credential. For example, the server may (i) obtain a credential 152b associated with the PAT identifier 182, (ii) transmit the credential 152b to the workstation 110, and (iii) provide the workstation 110 with access over the computer network 114 to a set of applications 170 using the credential 152b. For instance, the server 120 may provide the workstation 110 with the credential directly, may exchange the credential for a SAML token and provide the SAML token to the workstation 120, or may forward the credential 152b to one or more of the applications 170 directly, to authenticate the user 102 to such application or applications.

An improved technique has been described for providing access to protected resources, such as applications 170. The technique uses personal authentication tags (PATs) 104 and enforces a requirement that a workstation 110 sending an authentication request 180 must be trusted by a server 120 that receives the request 180. Accordingly, the server 120 allows an authentication request to proceed only when the request is received from a workstation having a preexisting trust relationship with the server 120. Otherwise, the server 120 denies the authentication request. By restricting PAT-type authentication requests to trusted workstations, risks posed by malicious users are greatly reduced.

Having described certain embodiments, numerous alternative embodiments or variations can be made. For example, although the server 120 has been shown and described as having various components, such components are included merely for illustrative purposes and should not be construed as limiting. Likewise, the particular acts as illustrated in FIGS. 2-5, which involve particular components of the workstation 110 and of the server 120, may be collapsed such that only the workstation 110 and the server 120 are involved. Although the resources requiring authentication are shown and described as applications 170, the same technique may be used for accessing any electronic resources, whether applications are specifically involved or not. Also, although examples have been shown that involve an enterprise network and a cloud-based server, other embodiments are not limited to enterprise applications or to those involving cloud-based servers.

Further, although features have been shown and described with reference to particular embodiments, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only.

Those skilled in the art will therefore understand that various changes in form and detail may be made to the embodiments disclosed herein without departing from the scope of the disclosure.

What is claimed is:

1. A method, comprising:
    issuing a key, $K_{TRUST}$, by a server to a workstation, the key issued in response to confirmation that the workstation has been registered with the server and reflecting a trust relationship established between the server and the workstation during a registration of the workstation to the server;
    receiving, by the server over a computer network, an authentication request from the workstation, the authentication request provided in a message encrypted using $K_{TRUST}$ and including an identifier of a personal authentication tag (PAT), the PAT being a portable object that provides the PAT identifier in a machine-readable format;
    in response to receiving the authentication request, determining that the workstation is trusted by the server, based at least in part on confirming that the message is encrypted using $K_{TRUST}$; and
    in response to determining that the workstation is trusted by the server, providing the workstation with access over the computer network to a set of applications of the server using a credential associated with the PAT identifier received with the authentication request.

2. The method of claim 1, further comprising, in response to determining that the workstation is trusted by the server, (i) obtaining, by the server, the credential associated with the PAT identifier, and (ii) transmitting the credential to the workstation.

3. The method of claim 2,
    wherein determining that the workstation is trusted by the server includes performing an operation configured to produce one of a first result and a second result, the first result produced in response to the server confirming that workstation is trusted by the server, the second result produced otherwise,
    wherein the server stores the credential in encrypted form, with the credential encrypted using an encryption key, $K_{PAT}$,
    wherein $K_{PAT}$ is derived from the PAT identifier, and
    wherein the method further comprises, in response to the operation producing the first result and prior to transmitting the credential to the workstation, decrypting the credential as encrypted using $K_{PAT}$.

4. The method of claim 3, wherein the server is configured to fail the authentication request in response to the operation producing the second result, which indicates an untrusted workstation.

5. The method of claim 3, wherein performing the operation includes confirming that the workstation is identified on a device white list (DWL) maintained by or otherwise accessible to the server, the server configured to fail the authentication request, thereby blocking access by the workstation to the set of applications, in response to the workstation not being listed on the DWL.

6. The method of claim 3, further comprising providing the workstation with a new instance of $K_{TRUST}$ upon a boot-up of the workstation, the server thereby limiting access to the set of applications using a stolen instance of $K_{TRUST}$.

7. The method of claim 3, wherein obtaining the credential associated with the PAT identifier includes:
accessing a PAT database to identify a user identifier that the PAT database associates with the PAT identifier; and
accessing a credential database to identify the credential associated with the user identifier.

8. The method of claim 7, wherein the PAT database and the credential database are hosted by respective services running on respective computers of the server.

9. The method of claim 8, further comprising, in response to (i) the operation producing the first result and (ii) the credential database not storing a credential associated with the user identifier:
directing the workstation to prompt a user to enter a user credential;
receiving the user credential from the workstation;
encrypting the user credential using $K_{PAT}$; and
storing the encrypted user credential in connection with the user identifier in the credential database.

10. The method of claim 9, further comprising, after receiving the user credential:
contacting an identity provider (IDP) that stores enterprise credentials and associated user identifiers of multiple users;
performing a verification operation configured to (i) generate a successful result in response to the IDP associating the user identifier of the user with a credential that matches the user credential and (ii) generate an unsuccessful result otherwise, and
in response to the verification operation producing the unsuccessful result, challenging the user to enter a correct credential.

11. The method of claim 3,
wherein, when receiving the PAT identifier from the workstation, the PAT identifier is encrypted using a key $K_{PIN}$ derived from additional entropy associated with the user.

12. The method of claim 11, wherein the additional entropy is a user PIN (Personal Identification Number).

13. The method of claim 1, further comprising:
obtaining information of the workstation; and
storing the information in a database of the server,
wherein issuing the key, $K_{TRUST}$, is performed after storing the information in the database and in response to comparing the information with other information stored in the database to determine a match.

14. The method of claim 13, further comprising:
providing a script to the workstation, the script to run upon startup of the workstation, to collect device information of the workstation, and to send the information to the server in a request for the key, $K_{TRUST}$.

15. The method of claim 14, wherein the information includes any of:
a make and model of the workstation;
an operating system running on the workstation;
a version of the operating system;
a location of the workstation; and
an identifier of the workstation.

16. The method of claim 13, wherein the information uniquely identifies the workstation.

17. A server apparatus, comprising a set of processors coupled to memory to form control circuitry, the control circuitry constructed and arranged to:
issue a key, $K_{TRUST}$, to a workstation, the key issued in response to confirmation that the workstation has been registered with the server and reflecting a trust relationship established between the server apparatus and the workstation during a registration of the workstation to the server apparatus;
receive, over a computer network, an authentication request from the workstation, the authentication request including an identifier of a personal authentication tag (PAT), the PAT being a portable object that provides the PAT identifier in a machine-readable format;
in response to receipt of the authentication request, determine that the workstation is trusted by the server apparatus, based at least in part on confirming that the message is encrypted using $K_{TRUST}$; and
in response to a determination that the workstation is trusted by the server apparatus, provide the workstation with access over the computer network to a set of applications using a credential associated with the PAT identifier received with the authentication request.

18. The server apparatus of claim 17,
wherein the server apparatus stores the credential in encrypted form, with the credential encrypted using an encryption key, $K_{PAT}$, and
wherein $K_{PAT}$ is derived at least in part by encrypting the PAT identifier with a user PIN and processing the PIN-encrypted PAT identifier to generate $K_{PAT}$.

19. A computer program product including a set of non-transitory, computer-readable media having instructions which, when executed by control circuitry of a server apparatus, cause the server apparatus to perform a method, the method comprising:
issuing a key, $K_{TRUST}$, by a server to a workstation, the key issued in response to confirmation that the workstation has been registered with the server and reflecting a trust relationship established between the server apparatus and the workstation during a registration of the workstation to the server apparatus;
receiving, over a computer network, an authentication request from the workstation, the authentication request provided in a message encrypted using $K_{TRUST}$ and including an identifier of a personal authentication tag (PAT), the PAT being a portable object that provides the PAT identifier in a machine-readable format;
in response to receiving the authentication request, determining that the workstation is trusted, based at least in part on confirming that the message is encrypted using $K_{TRUST}$; and
in response to determining that the workstation is trusted, providing the workstation with access over the computer network to a set of applications using a credential associated with the PAT identifier received with the authentication request.

20. The computer program product of claim 19,
wherein determining that the workstation is trusted by the server includes performing an operation configured to (i) produce a first result in response to the server confirming that workstation is trusted by the server and (ii) produce a second result otherwise,
wherein the server stores the credential in encrypted form, with the credential encrypted using an encryption key, $K_{PAT}$, and
wherein $K_{PAT}$ is derived from the PAT identifier.

21. The computer program product of claim 20, wherein $K_{PAT}$ is derived at least in part by encrypting the PAT identifier with a user PIN and processing the PIN-encrypted PAT identifier to generate $K_{PAT}$.

22. The computer program product of claim 20, wherein performing the operation includes confirming that the workstation is identified on a device white list (DWL) maintained by or otherwise accessible to the server, the server configured to fail the authentication request, thereby blocking access by the workstation to the set of applications, in response to the workstation not being listed on the DWL.

23. The computer program product of claim 20, wherein the method further comprises providing the workstation with a new instance of $K_{TRUST}$ upon a boot-up of the workstation, the server thereby limiting access to the set of applications using a stolen instance of $K_{TRUST}$.

* * * * *